UNITED STATES PATENT OFFICE.

JOSEPH PUTZEYS, OF HOUGAERDE, BELGIUM.

PROCESS OF MOLDING SUGAR.

SPECIFICATION forming part of Letters Patent No. 626,036, dated May 30, 1899.

Application filed January 6, 1897. Serial No. 618,175. (No specimens.)

*To all whom it may concern:*

Be it known that I, JOSEPH PUTZEYS, a subject of the King of Belgium, residing at Hougaerde, Belgium, have invented certain new and useful Improvements in Processes of Manufacturing Sugar, (patented in France, No. 245,913, March 19, 1895, and in Germany, No. 88,863, May 30, 1895;) and I do hereby declare the following to be a full, clear, and exact description of the invention, such as will enable others skilled in the art to which it appertains to make and use the same.

This invention relates to the refining of raw sugar; and its object is to simplify the said process—that is to say, that portion of the process by which the refined raw sugar is crystallized and formed into sugar loaves.

The present process, inasmuch as it relates to the treatment of the raw sugar, is substantially the same as that described in the German Patent No. 48,145; but the process of crystallizing the refined sugar and pressing or molding the same into sugar loaves is entirely different from any known process and is as follows: The refined sugar is first ground or pounded and afterward sifted, whereby about twenty to thirty per cent. of very fine powdered sugar and seventy to eighty per cent. of coarser powdered sugar is obtained. A certain quantity of the very fine powdered sugar is then dissolved in water at a temperature of from 30° to 70° centigrade, and the so-obtained concentrated syrup is filtered until it is as clear as water. Thirty to thirty-five per cent. of the above-mentioned filtered syrup is then added to about sixty-five to seventy per cent. of the more coarsely powdered sugar. This mixture is thereupon heated and stirred, and after a temperature of 60° centigrade has been reached it will contain from two to four per cent. of moisture. Crystallization then ensues, and the result is a production of one hundred and five to one hundred and ten kilograms of crystallized sugar from one hundred kilograms of the refined sugar initially taken. The crystallization is not complete, for a portion of the solution refuses to pass from the liquid state. The residual liquid thus produced I therefore combine with some of the initial solution, consisting of the aforesaid filtered syrup, and the result is a product which when combined with the more coarsely pulverized sugar forms a mixture that will crystallize. Hence a material saving is effected, for what would otherwise be and is at present commonly thrown aside as useless is made good use of. Having thus obtained crystallized sugar, which on account of its moisture is porous and spongy, I then add from twenty to thirty per cent. of fine powdered sugar, whereby the said pores are filled up and the mass given a pure white appearance. Of course it appears somewhat dull, but that does not affect its commercial value. The so-obtained product is then formed into cakes or loaves, for which purpose the so-called "briquet-presses" or ordinary hand-presses are used, and to prevent the deformation of the press-plates and the sugar cake or loaf arranged thereon the following method is applied: On the bottom of the mold is placed a wooden plate, and on the latter a plate made of zinc or steel. The sugar to be formed is put on the said metal plate and is then subjected to pressure. When the pressure is released, the cake or loaf of sugar is removed from its mold, together with the plates supporting it, and is carried to the drying-room, where after remaining about one or two hours the said cakes or loaves have hardened enough to be placed upon wooden horses or similar frames. The above-described process requires in all about eighteen hours, and in so crystallizing one hundred kilograms of refined sugar only about five per cent. of farina sugar and syrup is produced and thus lost in the process.

Having thus described my invention, what I claim as new, and desire to secure by Letters Patent, is—

The herein-described process, consisting in making a solution of water and finely-pulverized sugar, then mixing a portion of the solution with more coarsely pulverized sugar, crystallizing the mixture under heat, separating the resultant crystallized product and the residual syrup, mixing the said residual syrup with more of the first solution to form a second solution, and, lastly, repeating the foregoing steps of the process using the second solution in lieu of the first solution to form the mixture with the coarsely-pulverized sugar, substantially as described.

In testimony whereof I have hereto set my hand in the presence of the two undersigned witnesses.

JOSEPH PUTZEYS.

Witnesses:
  A. FAES,
  ALBERT JANSSEN.